United States Patent
Tarpill et al.

(12)

(10) Patent No.: US 6,581,291 B1
(45) Date of Patent: Jun. 24, 2003

(54) CABLE STRIPPING TOOL

(75) Inventors: Andrew J. Tarpill, East Haddam, CT (US); Tadeusz Zagula, West Hartford, CT (US)

(73) Assignee: Capewell Components Company, LLC, Cromwell, CT (US)

( * ) Notice: Subject to any disclaimer, the term of this patent is extended or adjusted under 35 U.S.C. 154(b) by 50 days.

(21) Appl. No.: 09/974,012

(22) Filed: Oct. 9, 2001

(51) Int. Cl.[7] ............................. B21F 13/00; H02G 1/12
(52) U.S. Cl. ......................... 30/90.4; 30/90.1; 30/90.9
(58) Field of Search ............................. 30/90.1, 90.4, 30/90.8, 90.9; 81/9.41

(56) References Cited

U.S. PATENT DOCUMENTS

| | | | | |
|---|---|---|---|---|
| 1,798,683 A | * | 3/1931 | Korab | 30/90.9 |
| 2,538,453 A | * | 1/1951 | Harkins | 30/90.9 |
| 2,649,654 A | * | 8/1953 | Carta | 30/90.9 |
| 2,778,105 A | * | 1/1957 | Carta | 30/90.7 |
| 2,875,516 A | * | 3/1959 | Parks | 30/90.1 |
| 3,433,106 A | | 3/1969 | Matthews | 81/9.4 |
| 3,535,785 A | | 10/1970 | Matthews | 30/91.2 |
| 3,722,092 A | * | 3/1973 | Lukas | 30/90.9 |
| 3,990,331 A | | 11/1976 | Matthews | 30/90.1 |
| 4,028,800 A | | 6/1977 | Matthews | 30/90.1 |
| D301,970 S | | 7/1989 | Matthews | D8/98 |
| 4,945,788 A | | 8/1990 | Matthews | 81/9.4 |
| 4,955,137 A | | 9/1990 | Matthews | 30/90.1 |
| 4,979,299 A | * | 12/1990 | Bieganski | 30/90.1 |
| 5,713,132 A | | 2/1998 | Tarpill | 30/90.2 |
| 5,956,852 A | | 9/1999 | Tarpill | 30/90.3 |
| 6,018,873 A | * | 2/2000 | McClellan | 30/90.4 |

FOREIGN PATENT DOCUMENTS

EP    0 376 505 A1 *  7/1990

* cited by examiner

*Primary Examiner*—Hwei-Siu Payer
(74) *Attorney, Agent, or Firm*—DeLio & Peterson, LLC

(57) ABSTRACT

An adjustable cable slitting tool for longitudinally slitting optical fiber buffer tubes and other precision cables includes a T-shaped body and a guide that slides relative to the body to hold and guide the cable to be slit in a guide channel. A slitting blade is mounted on a blade carriage that can be precisely adjusted with an adjustment screw to control the depth the slitting blade projects into the guide channel. A scale and indicator marks allow the desired depth of cut to be adjusted with precision by comparing indicator marks on the adjustment screw with the scale and other indicator marks on the tool body. The adjustment screw has a tapered portion that drives the blade carriage through a single contact point via a ball bearing. A deformable pad material in contact with a threaded portion of the adjustment screw acts as both a friction adjustment and part of the backlash prevention mechanism. The backlash prevention mechanism includes several elements that cooperate to substantially completely eliminate objectionable backlash.

32 Claims, 2 Drawing Sheets

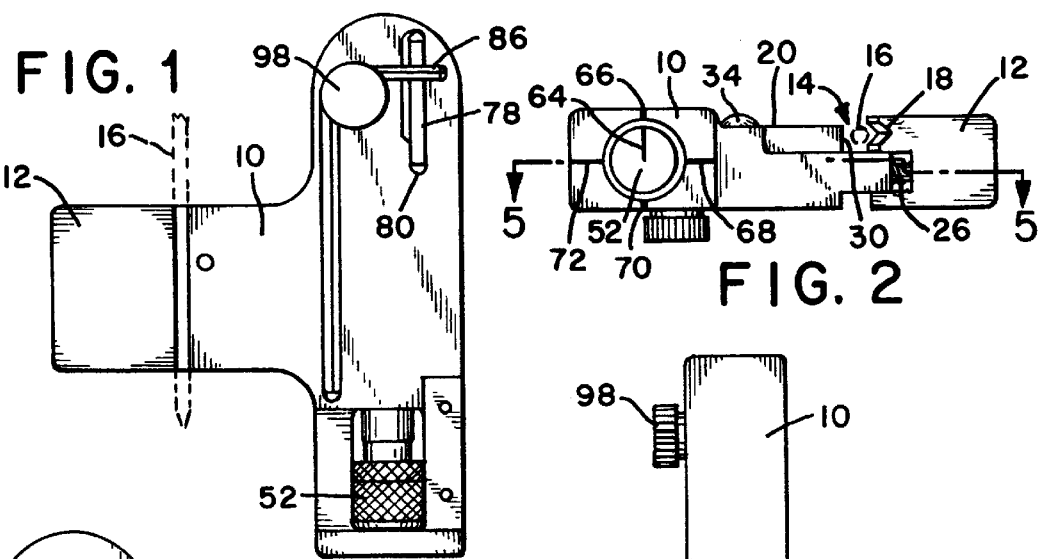
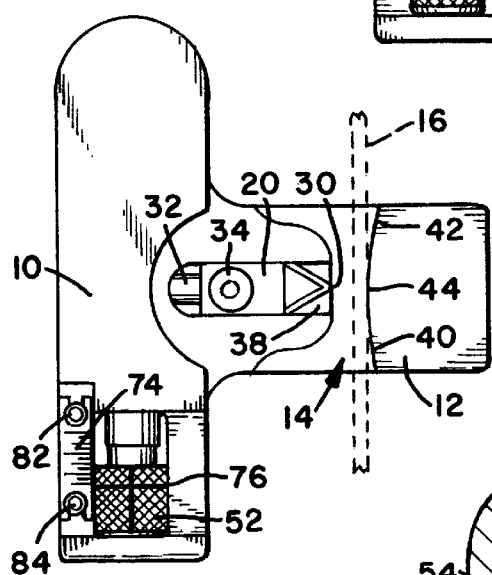
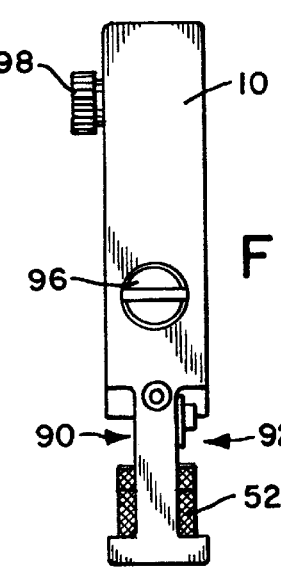
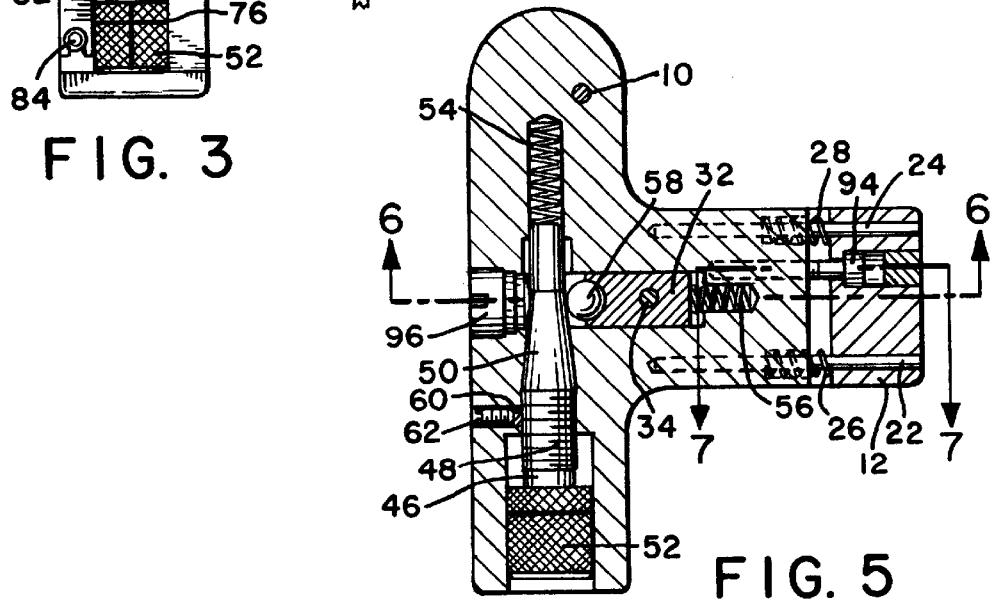

CABLE STRIPPING TOOL

BACKGROUND OF THE INVENTION

1. Field of the Invention

This invention relates to hand tools for longitudinally slitting the outer coating on a cable to allow mid-span access to optical fibers or wires in the interior of the cable.

2. Description of Related Art

In order to connect to a cable, such as an optical fiber cable or a coaxial cable, the outer coating or insulation must be cut to expose the optical fibers or wires inside. One method of access is to completely cut the cable and remove the outer coating from the exposed end in an end stripping operation. However, often the cable will contain multiple optical fibers or wires and access to only one of them is needed. This requires mid-span access to the interior of the cable without cutting or damaging the adjacent fibers or wires.

Mid-span access to the interior of a cable is usually achieved by making a longitudinal cut through the outer coating of the cable, parallel to the axis of the cable. The longitudinal cut allows the outer coating to be peeled open to expose the interior so that the desired fiber or wire can be selected and a connection made.

Tools designed to make this type of longitudinal slitting cut typically have a guide that holds the cable in a desired orientation and a slitting blade mounted on the tool in parallel alignment with the guide. The slitting blade is adjusted so that its tip just penetrates the outer coating when the cable is held in the guide portion of the tool. The longitudinal cut is made by moving the tool axially along the cable for the desired distance.

When making a cut of this type, it is important to avoid damaging the wires or optical fibers in the interior of the cable. This is critically important when the cable is an optical fiber cable where any contact between the slitting blade and the optical fiber can scratch the fiber and potentially make the fiber unusable.

In a conventional multiple strand optical fiber cable, one or more optical fibers are encased within a buffer tube. Multiple buffer tubes are then combined to form a single cable by encasing them in an outer protective jacket. Slitting the outer jacket longitudinally to provide mid-span access to the buffer tubes is not considered to be difficult as the optical fibers are further protected by the buffer tube.

However, longitudinally slitting an interior buffer tube, without scratching or damaging the optical fibers inside requires a very high level of skill and an extremely precise slitting tool. To obtain the precision needed for this operation, buffer slitters presently available have been designed with a fixed blade to correspond to a specific wall thickness of the buffer tube and a specific size of buffer tube. Adjustable slitting tools capable of precise and repeatable adjustment of the slitting blade depth to accommodate buffer tubes of different diameters and different wall thicknesses from different manufacturers have not been available.

A particular difficulty with any type of adjustable mechanism is avoiding backlash. A typical optical fiber buffer tube may have a diameter between 63 and 122 thousandths of an inch (1.6 to 3.1 mm). The wall thickness of the buffer tube may be only 1.5 thousandths of an inch (38 micrometers). Consequently, for an adjustable buffer tube slitter it is critical that the blade depth be accurately controlled so that it can be set to the desired depth. Further, the adjustment mechanism needs to substantially completely eliminate any significant backlash so that previous depth settings can be used repeatedly.

Bearing in mind the problems and deficiencies of the prior art, it is therefore an object of the present invention to provide a cable slitting tool suitable for longitudinally slitting cables, including optical fiber buffer tubes, that is precisely adjustable to control the depth of cut.

Another object of the present invention is to provide an adjustable cable slitting tool wherein the adjustment is precisely repeatable so the tool can be accurately reset to a depth setting used previously.

A further object of the present invention is to provide an adjustable cable slitting tool having little or no backlash.

It is yet another object of the invention to provide a cable slitting tool that can adjusted to a desired slitting depth.

Still another object of the invention is to provide a cable slitting tool that can be adjusted by hand.

A further object of the present invention is to provide an adjustable cable slitting tool that can be easily disassembled and which carries an attached tool for disassembly.

SUMMARY OF THE INVENTION

The above and other objects, which will be apparent to those skilled in the art, are achieved in the present invention which is directed to a cable slitting tool that includes a tool body, preferably having a T-shape and a cable guide mounted on the tool body. The tool body and cable guide define a guide channel between them that receives the cable to be slit longitudinally. A blade carriage is movably mounted on the tool body so that it may be moved towards and away from the cable. A slitting blade is mounted on the blade carriage so that it can be adjusted to project into the guide channel.

An adjustment screw moves the blade carriage relative to the tool body to adjust the distance the slitting blade projects into the guide channel. Rotating the adjustment screw in a first direction increases the distance the slitting blade projects into the guide channel, while rotating it in the opposite direction decreases the distance the slitting blade projects into the guide channel.

A backlash prevention mechanism cooperates with the adjustment screw to prevent backlash as the adjustment screw changes from rotating in the first direction to rotating in the opposite direction. In the preferred embodiment of the invention, the backlash prevention mechanism includes several distinct elements that cooperate to reduce backlash to very low levels or completely eliminate it. The individual elements of the backlash prevention mechanism may be used separately, they may be used in combination with each other, or they may be supplemented or replaced with other known devices for preventing or eliminating backlash, depending on the type of cable to be slit. However, the multiple element backlash prevention mechanism shown is particularly effective for achieving the level of precision required for slitting buffer tubes containing optical fibers.

In one aspect of the invention, the backlash prevention mechanism of the cable slitting tool includes a deformable material in friction contact with the adjustment screw and a friction adjustment for adjusting pressure between the deformable material and the adjustment screw. The friction adjustment is preferably a set screw.

In another aspect of the invention, the blade carriage moves perpendicular to the rotational axis of the adjustment screw and the adjustment screw includes a tapered portion.

The blade carriage is driven perpendicular to the rotational axis of the adjustment screw by contact with the tapered portion of the adjustment screw as the adjustment screw is rotated. Most preferably, the blade carriage is moved through a single point contact design with the tapered portion of the adjustment screw. In the disclosed design, the single point contact is provided by a ball located between the tapered portion of the adjustment screw and the blade carriage.

In still another aspect of the invention, the backlash prevention mechanism of the cable slitting tool includes an adjustment screw spring in contact with the adjustment screw. The adjustment screw spring applies a spring force to the adjustment screw parallel to the axis of the adjustment screw to compensate for any backlash due to the clearance required between the threads of the adjustment screw and the corresponding threaded opening in the tool body.

Still another part of the backlash prevention mechanism in the preferred design of the cable slitting tool is a blade carriage spring that applies a spring force to the blade carriage perpendicular to the axis of the adjustment screw. The blade carriage spring maintains the preferred single point contact between the ball and the tapered portion of the adjustment screw.

The adjustment screw is provided with a knurled knob and the tool body is partially cut away to provide access to the knob and allow the adjustment screw to be rotated by hand. Another feature of the invention is the provision of an indicator for indicating motion of the adjustment screw as the distance the slitting blade projects into the guide channel is adjusted. The indicator includes a scale on the tool body and an indicator mark on the adjustment screw. Preferably the tool is also provided with indicator marks on an end of the tool body and a corresponding indicator mark on an end of the adjustment screw.

In the embodiment of the invention shown, the cable guide is slidably mounted on the tool body for motion between an open position to allow a cable to be positioned in the guide channel and a closed position to bring the cable into slitting contact with the slitting blade. At least one cable guide spring is provided for biasing the cable guide towards the open position. It is preferred for the cable guide to slide on a pair of guide rods between the open and the closed position and for a pair of cable guide springs to bias the cable guide towards the open position.

In another embodiment of the invention two parallel mounted slitting blades are used instead of a single slitting blade. In this embodiment, a guide wheel in rolling contact with the cable acts to guide the cable with reduced friction.

In another aspect of the invention, the tool body includes a gage block cavity for holding a gage block and a wrench cavity for holding a wrench. A hold-down screw holds the wrench in the wrench cavity and the wrench cavity overlaps the gage block cavity such that the wrench holds the gage block in the gage block cavity when the wrench is in the wrench cavity.

BRIEF DESCRIPTION OF THE DRAWINGS

For a fuller understanding of the invention, reference should be made to the following description taken in connection with the accompanying drawings, in which:

FIG. 1 is a left side elevational view of the cable slitting tool of the present invention.

FIG. 2 is a rear elevational view of the cable slitting tool shown in FIG. 1.

FIG. 3 is a right side elevational view of the cable slitting tool shown in FIG. 1.

FIG. 4 is a top view of the cable slitting tool shown in FIG. 1.

FIG. 5 is a cross sectional view of the cable slitting tool, from the right side, taken along the line 5—5 in FIG. 2.

DESCRIPTION OF THE PREFERRED EMBODIMENT

Figure 6:
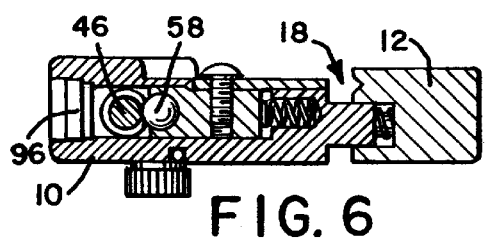
FIG. 6 is a cross sectional view of the cable slitting tool, looking from the rear towards the front, the cross section being taken along the line 6—6 in FIG. 5.

In describing the preferred embodiment of the present invention, reference will be made herein to FIGS. 1–10 of the drawings in which like numerals refer to like features of the invention.

FIGS. 1 through 7 show a first embodiment of the cable slitting tool of the present invention, which includes a T-shaped tool body 10 and a cable guide 12 that define a guide channel 14 between them (see FIG. 3). The cable guide slides relative to the tool body from an open position (seen best in FIGS. 3 and 7) to a closed position in which the sides of the guide channel 14 lightly contact opposite sides of a cable 16 to be slit longitudinally.

In the open position the user can insert the cable 16 into the open guide channel. In the closed position a V-shaped groove 18, formed on an inner surface of the guide channel, keeps the cable 16 aligned with slitting blade 20 mounted on the tool body 10 directly opposite the groove 18.

The sliding motion of the cable guide into the closed position brings the cable into slitting contact with the slitting blade to initiate the longitudinal cut. The V-shaped groove 1 8 ensures that the relationship between the blade and the cable will be correct. The cable guide 12 slides towards the tool body 10 on guide rods 22, 24. A pair of cable guide springs 26, 28 are located around the guide rods 22, 24 and bias the cable guide towards the open position. As the user of the tool squeezes the cable guide towards the tool body (against the pressure of the cable guide springs) the cable 16 is brought into slitting contact with the slitting blade 20.

The cable guide 12 is squeezed towards the tool body 10 until the outer surface of the cable 16 is brought into tangential contact with a reference surface 30 on the tool body side of the guide channel 14. The slitting blade 20 is accurately adjusted prior to this in the manner described below so that it projects a desired distance beyond the plane of the reference surface 30. Preferably the slitting depth is approximately the same as, or just slightly less than the wall thickness of the buffer tube or insulating coating on cable 16.

To allow adjustment of the slitting depth, the slitting blade 20 is mounted on a sliding blade carriage 32 that can be moved with extreme precision perpendicular to the axis of the cable 16 by rotating a knurled depth adjustment knob 52. The blade carriage 32 is substantially cylindrical, but includes a flat mounting surface on which the slitting blade 20 is mounted. Blade mounting screw 34 extends through a hole in the blade and threads into threaded opening 36 in the blade carriage to hold the slitting blade 20 securely thereto. There is a slight clearance between the hole in the blade 20 and the body of screw 34, which allows the position of the slitting blade to be adjusted initially relative to the blade carriage as will be further described below.

The width of the slitting blade 20 is greater than the width of the blade carriage 32 and the overlapping portions of the slitting blade slide against the flat bottom surface of a channel 38 on opposite sides of the blade carriage as the blade carriage moves. This sliding contact prevents the cylindrical blade carriage from rotating around its axis and keeps the plane of the slitting blade parallel to the axis of the cable 16.

The width of the channel 38 is just slightly larger than the width of the blade so that the outer edges of the slitting blade are also guided by the channel 38 through sliding contact between the edges of the slitting blade and the perpendicular sidewalls of the channel 38. This contact with the sidewalls prevents the slitting blade from rotating around the axis of the blade mounting screw 34.

Referring to FIG. 3, the cable guide 12 includes two surfaces 40 and 42 that act as lead-in and lead-out surfaces. The two surfaces 40 and 42 are at an angle to each other such that the cable 16 is only in contact with the groove 18 over a short transition surface 44 near the slitting blade 20. The transition surface 44 is approximately parallel to the opposing reference surface 30. This short region of contact between the lead-in/out surfaces and the cable 16 reduces the sliding friction between the cable and the tool as the longitudinal slitting cut is made. The tool may be moved in either direction along the length of the cable to make the longitudinal cut and either of the surfaces 40 or 42 may be the lead-in surface with the other being the lead-out surface.

To adjust the depth of the slitting cut, the blade carriage 32 is moved towards and away from the cable 16 by an adjustment screw 46 which includes a threaded portion 48, a tapered portion 50 and the knurled knob 52 (see FIG. 5). The threaded portion 48 threadedly engages a corresponding threaded opening in the tool body 10 so that rotation of the knurled adjustment knob 52 causes the tapered portion 50 of the adjustment screw 46 to advance into the tool. The threaded motion of the adjustment screw 46 into the tool body 10 causes the expanding diameter of the tapered portion of the adjustment screw at its single point of contact with ball bearing 58 to drive the blade carriage perpendicularly towards the cable 16.

The single point contact design does not require direct contact between the tapered portion 50 and the blade carriage. It is preferred that the contact between the blade carriage and the tapered portion be indirect—through the precision ball bearing 58 located between the blade carriage and the tapered portion of the adjustment screw. The ball bearing 58 may have multiple points of contact with the blade carriage but will have only a single contact point with the tapered portion of the adjustment screw. This single point of contact on the precision ball bearing cooperates with the precision surface on the tapered portion 50 of the adjustment screw to produce an extremely precise and smooth motion of the blade carriage towards and away from the cable as the adjustment knob 52 is rotated.

The design shown includes numerous features that cooperate to prevent backlash. An important component of the backlash prevention mechanism in this tool is adjustment screw spring 54. This spring applies a force to the adjustment screw parallel to the axis of the screw. This axial spring force helps ensure that the adjustment screw returns to the same position each time it is rotated to the same point relative to the tool body. Without the adjustment screw spring 54 clearance between the internally threaded opening in the tool body and the external threads on the threaded portion of the adjustment screw would allow relative motion between the two.

A second component of the backlash prevention mechanism in this tool is blade carriage spring 56 and the single point contact design. The blade carriage spring 56 applies a force to the blade carriage perpendicular to the axis of the adjustment screw. This force keeps the blade carriage in the desired constant single point contact with the tapered portion of the adjustment screw through precision ball 58.

Another feature of the tool that contributes to its accuracy is the manner in which the end of the adjustment screw 46 that is in contact with adjustment screw spring 54 is mounted. This end is rotationally held in the same opening of the tool body 10 that holds the adjustment screw spring 54. This supports the adjustment screw at both ends and keeps the axis of the adjustment screw parallel to the cable at all times, thereby preventing any flexing or non-uniform motion as the adjustment screw rotates.

A third component of the backlash prevention mechanism is provided by friction pad 60 (made of a deformable material) and set screw 62. The friction pad 60 is held in contact with the threaded portion 48 of the adjustment screw 46 by set screw 62, which is threaded into a corresponding opening in the tool body 10. The set screw 62 can be tightened or loosened (using Allen wrench tool 86 seen in FIG. 1) to increase or decrease the contact force between the deformable friction pad 60 and the threads on the threaded portion 48. The deformable material of pad 60 is preferably a plastic material, such as nylon, which deforms to match the exact shape of the threads. This provides a nearly perfect zero-clearance match to the threads on the adjustment screw and prevents backlash as the knob 52 reverses direction.

In addition to providing backlash prevention, the deformable material of pad 60 and the set screw 62 combine to form a friction adjustment. The tool user can increase the friction or decrease the friction to the desired level with tool 86. Preferably the friction is set to a sufficiently high level that the adjustment knob 52 will not move except when the tool user applies a rotational force.

The adjustment screw spring 54 in combination with the single point contact design of ball 58, the blade carriage spring 56 and the properties of the deformable material 60 in the friction adjustment all cooperate to form the backlash prevention mechanism of this design. The multiple elements of the backlash prevention mechanism described and other known backlash prevention designs may be combined or used Individually to reduce or eliminate backlash. However, in the described combination they are particularly effective at reducing backlash to below the level that would affect operation of the tool in its preferred task of precisely slitting buffer tubes surrounding optical fibers.

As can be seen in FIG. 1 the Allen wrench 86 fits within a corresponding wrench cavity and the wrench 86 is held in that cavity by a hold down screw 98. The wrench cavity overlaps the gage block cavity 80 such that the gage block 78 is held in its corresponding gage block cavity 80 whenever the wrench 86 is held in the wrench cavity by hold down screw 98. Removing the hold down screw 98 releases both the gage block 78 and the wrench 86 from their corresponding cavities.

In the preferred design, the thread pitch on the threaded portion 48 and the taper angle on the tapered portion 50 are adjusted so that one complete revolution of the adjustment screw 46 causes a motion in the perpendicular direction of the blade carriage 32 of exactly four thousandths of an inch (0.004 in. or approximately 0.1 mm).

As can be seen in FIG. 2, the outer end of knurled knob 52 is provided with a single indicator mark 64 that can be aligned with any one of four corresponding indicator marks 66, 68, 70 or 72 marked on the tool at the 0°, 90°, 180° and 270° positions. Each quarter rotation of the adjustment knob (from one indicator mark to the next) will move the blade carriage and the slitting blade mounted thereon towards or away from the cable 16 by one thousandth of an inch (0.001 in.). The backlash prevention mechanism ensures that the blade returns accurately to the same slitting depth each time the knob is rotated to the same position. By comparing the location of the indicator mark 64 to the four marks 66, 68, 70 or 72, the slitting depth may be accurately increased or decreased by a desired amount.

As can be seen in FIG. 3, the tool also includes a scale 74 that is read by comparing the location of indicator groove 76 on the knurled knob 52 with the marks along scale 74. As the adjustment screw is rotated clockwise, it advances into the tool body, changing the relative position between the indicator groove 76 and the scale 74. Each mark along the scale indicates four one thousandths of an inch (0.004 in.) and a single rotation of the adjustment screw moves the indicator groove 76 by one division mark along the scale. By reading the relationship between indicator groove 76 and the linear scale 74 and then determining the relationship between the indicator mark 64 and the rotational indicator marks 66, 68, 70 or 72, the precise depth of the slitting blade can be determined provided the initial position is correctly set.

The desired initial position is with the tip of the slitting blade exactly tangential to the plane defined by reference surface 30. The tip of the blade can then be extended to a precise desired slitting depth by rotating the adjustment screw until the indicator marks show the desired slitting depth.

To set the desired initial tangential position of the slitting blade, adjustment screw 46 is rotated until indicator mark 64 is aligned with one of the four indicator marks 66, 68, 70 or 72. The scale 74 is then adjusted by loosening scale hold down screws 82, 84 (see FIG. 4) and the scale 74 is moved until one of the indicator marks thereon is aligned with the ring indicator groove mark 76 on the knurled knob 52. The scale hold down screws 82, 84 are then tightened and the slitting blade mounting screw 34 is then loosened.

Gage block 78, which is stored in the gage block cavity 80 (see FIG. 1), is then inserted into the guide channel 14. The gage block 78 includes a flat surface that faces reference surface 30. The cable guide 12 is then compressed (without a cable in the guide channel), which brings the flat surface of the gage block 78 into planar alignment with reference surface 30.

The slitting blade 20 is then gently moved into precise contact with the surface of the gage block 78 and screw 34 is tightened. The clearance between the screw 34 and the opening in the slitting blade through which screw 34 extends allows the tip of the slitting blade 20 to be set to the desired tangential position relative to the plane of reference surface 30. When a cable 16 is inserted into the guide channel and the cable guide is squeezed towards the reference surface 30, the outer surface of the cable 16 will be exactly tangential to the tip of slitting blade 20.

The adjustment screw 46 can then be rotated by the precise amount desired to extend the tip of the slitting blade beyond the reference plane of surface 30. Each quarter rotation of the adjustment screw causes a one thousandth of an inch increase in the depth of the slitting cut. The depth can be increased or decreased as desired and previous settings can be reused by reference to the indicator system provided by scale 74 and the indicator marks on the adjustment screw and on the tool body.

Figure 7:
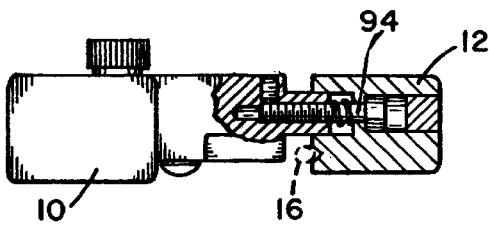
FIG. 7 is a partial cross sectional view of the cable slitting tool, looking from the front towards the rear, the partial cross section being taken along the line 7—7 in FIG. 5.

As can be seen in FIG. 4, the tool body 10 is provided with opposed cutout regions 90, 92 which allow the operator to grip the knurled knob 52 between opposed fingers and rotate it. As can be seen in FIGS. 5 and 7, the outward motion of the cable guide 12 under the biasing pressure of the springs 26 and 28 is limited by the head of a screw 94. As can be seen in FIGS. 5 and 6, access to the blade carriage 32 and ball 58 is provided by removing the adjustment screw 46 and a threaded access cap 96.

Figure 8:
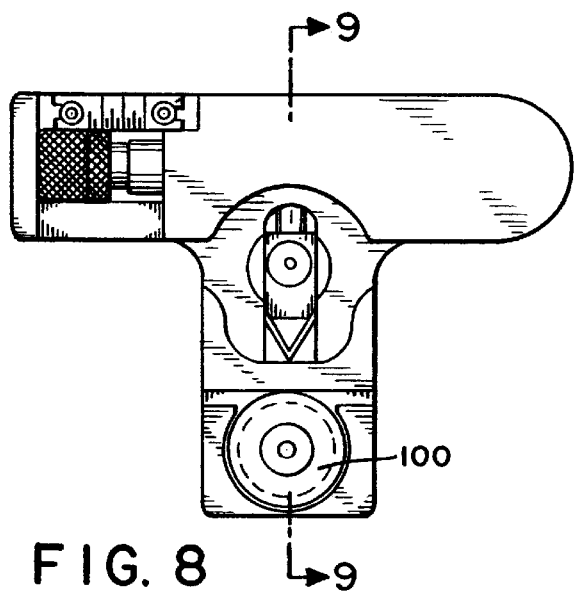
FIG. 8 is a right side elevational view of an alternative embodiment of a cable slitting tool according to the present invention in which a wheel is used to reduce friction between the tool and the cable.
Figure 9:
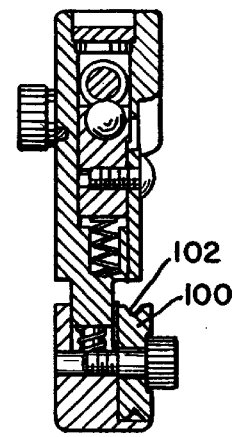
FIG. 9 is a cross sectional view of the cable slitting tool in FIG. 7, looking from the rear towards the front, the cross section being taken along the line 9—9 in FIG. 8.
Figure 10:
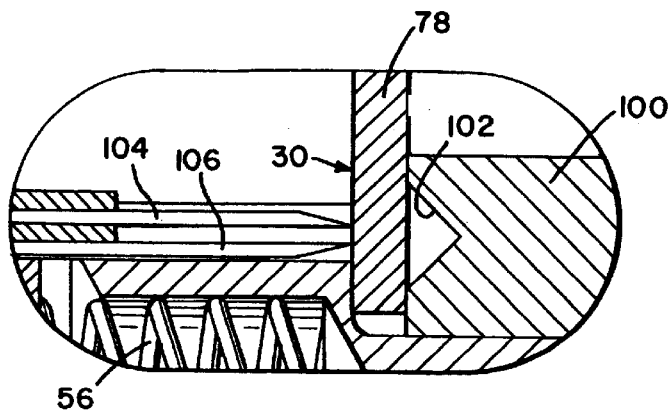
FIG. 10 is a detail cross sectional view at an enlarged scale showing the guide channel and double slitting blades in the embodiment of the invention shown in FIGS. 8–9, as well as the position of a gage block when used to set the initial tangential location of the slitting blades.

FIGS. 8–10 show an alternative embodiment of the invention in which the single slitting blade of the design in FIGS. 1–7 is replaced by two parallel slitting blades and the transition surface and lead-in/lead-out surfaces are replaced by a guide wheel to reduce friction. FIGS. 8 and 9 show the guide wheel 100 that performs the function of the lead-in and lead-out surfaces 40, 42 and transition surface 44 described previously. Guide wheel 100 includes a V-shaped notch 102 around its perimeter which receives the cable and holds it in the desired position for slitting. This notch 102 performs the function of V-shaped groove 18 previously described.

FIG. 10 provides a detailed view of the dual slitting blades 104 and 106 of this embodiment, the single slitting blade described previously is replaced with two slitting blades which make parallel cuts. This allows a small sliver of the outer coating on the cable 16 to be removed, providing easier access to the interior of the cable.

FIG. 10 shows how the dual slitting blades 104 and 106 are initially adjusted to the tangential plane of reference surface 30 by positioning gage block 78 between guide wheel 100 and reference surface 30.

The term "cable" as used herein is intended to include optical fiber buffer tubes as well as other types of jacketed or insulated fibers and wires needing precision longitudinal slitting. The tool described herein is specially designed to provide the extreme precision and repeatable adjustability needed to longitudinally slit different sizes and types of optical fiber buffer tubes available from different manufacturers without damaging the fibers inside. In the optical fiber industry, non-adjustable single purpose tools capable of slitting a specific size buffer tube are often referred to as "buffer tube slitters" and the present invention performs this function. However, the present invention, is also capable of precision slitting other types of jacketed wires and fibers and is not limited to slitting optical fiber buffer tubes.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

Thus, having described the invention, what is claimed is:

1. A cable slitting tool comprising:
    a tool body;
    a cable guide mounted on the tool body, the tool body and the cable guide defining a guide channel therebetween for receiving a cable to be slit longitudinally;
    a blade carriage movably mounted on the tool body;
    a slitting blade mounted on the blade carriage and projecting a distance into the guide channel;
    an adjustment screw connected to move the blade carriage relative to the tool body and adjust the distance the slitting blade projects into the guide channel, the adjustment screw defining a rotational axis and rotating in a first direction to increase the distance the slitting blade projects into the guide channel and in an opposite direction to decrease the distance the slitting blade projects into the guide channel; and
    a backlash prevention mechanism cooperating with the adjustment screw to prevent backlash as the adjustment screw changes from rotating in the first direction to rotating in the opposite direction.

2. The cable slitting tool according to claim 1 wherein the backlash prevention mechanism includes a deformable material in friction contact with the adjustment screw.

3. The cable slitting tool according to claim 2 further including a friction adjustment for adjusting pressure between the deformable material and the adjustment screw.

4. The cable slitting tool according to claim 2 wherein the friction adjustment is a set screw.

5. The cable slitting tool according to claim 1 wherein the blade carriage moves perpendicular to the rotational axis of the adjustment screw and the adjustment screw includes a tapered portion, the blade carriage being driven perpendicular to the rotational axis of the adjustment screw by contact with the tapered portion of the adjustment screw as the adjustment screw is rotated.

6. The cable slitting tool according to claim 5 wherein the blade carriage is moved through a single point contact with the tapered portion of the adjustment screw.

7. The cable slitting tool according to claim 6 further including a ball located between the tapered portion of the adjustment screw and the blade carriage, the ball providing the single point contact with the tapered portion of the adjustment screw.

8. The cable slitting tool according to claim 5 wherein the backlash prevention mechanism includes an adjustment screw spring in contact with the adjustment screw, the adjustment screw spring applying a spring force to the adjustment screw parallel to the axis of the adjustment screw.

9. The cable slitting tool according to claim 5 wherein the backlash prevention mechanism includes a blade carriage spring in contact with the blade carriage, the blade carriage spring applying a spring force to the blade carriage perpendicular to the axis of the adjustment screw.

10. The cable slitting tool according to claim 1 wherein the adjustment screw is rotatable by hand to rotate the adjustment screw.

11. The cable slitting tool according to claim 1 further including an indicator for indicating motion of the adjustment screw as the distance the slitting blade projects into the guide channel is adjusted.

12. The cable slitting tool according to claim 11 wherein the indicator comprises a scale on the tool body and an indicator mark on the adjustment screw.

13. The cable slitting tool according to claim 11 wherein the indicator comprises a scale on the tool body and an indicator mark on the adjustment screw, the scale being parallel to the axis of the adjustment screw.

14. The cable slitting tool according to claim 11 wherein the indicator comprises an indicator mark on the tool body and an indicator mark on an end of the adjustment screw.

15. The cable slitting tool according to claim 1 wherein the cable guide is slidably mounted on the tool body for motion between an open position to allow a cable to be positioned in the guide channel and a closed position to bring the cable into slitting contact with the slitting blade.

16. The cable slitting tool according to claim 15 further including at least one cable guide spring for biasing the cable guide towards the open position.

17. The cable slitting tool according to claim 15 further including:
    a pair of guide rods, the cable guide sliding on the guide rods between the open and the closed position; and
    a pair of cable guide springs for biasing the cable guide towards the open position.

18. The cable slitting tool according to claim 1 further including a second slitting blade mounted on the blade carriage in parallel alignment with the first slitting blade.

19. The cable slitting tool according to claim 1 further including a guide wheel, the guide wheel further defining the guide channel and the cable being in rolling contact with the guide wheel as the cable is slit.

20. The cable slitting tool according to claim 1 wherein the tool body has a T-shape.

21. The cable slitting tool according to claim 1 wherein the tool body includes at least one cutout to provide access to the adjustment screw by a tool operator for rotation of the adjustment screw by hand.

22. The cable slitting tool according to claim 21 wherein the adjustment screw includes a knurled head for rotating the adjustment screw by hand.

23. The cable slitting tool according to claim 1 wherein the blade carriage is substantially cylindrical and includes a flat for mounting the slitting blade thereon.

24. The cable slitting tool according to claim 23 wherein the slitting blade is in sliding contact with the tool body to prevent rotation of the blade carriage.

25. The cable slitting tool according to claim 1 wherein the cable guide includes a lead-in surface and a lead-out surface, the lead-in surface being at an angle to the lead-out surface to minimize frictional contact with the cable.

26. The cable slitting tool according to claim 1 wherein the tool body includes a gage block cavity for holding a gage block.

27. The cable slitting tool according to claim 26 wherein the tool body further includes:
    a wrench cavity for holding a wrench; and
    a hold-down screw for holding the wrench in the wrench cavity;
    the wrench cavity overlapping the gage block cavity and the wrench holding the gage block in the gage block cavity when the wrench is in the wrench cavity.

28. The cable slitting tool according to claim 1 wherein the tool body includes a wrench cavity for holding a wrench.

29. The cable slitting tool according to claim 1 wherein the tool body includes an alignment surface for setting a starting position for the distance the slitting blade projects into the guide channel.

30. The cable slitting tool according to claim 29 wherein the alignment surface is tangent to the guide channel to allow the slitting blade to be set to project zero distance into the guide channel.

31. A cable slitting tool comprising:

a tool body having a threaded opening;

a cable guide mounted on the tool body, the tool body and the cable guide defining a guide channel parallel to the threaded opening for receiving a cable to be slit longitudinally, the cable guide being movable between an open position to receive a cable and a closed position to bring the cable into a slitting position;

a blade carriage mounted on the tool body for motion perpendicular to the guide channel;

a slitting blade mounted on the blade carriage and projecting a distance into the guide channel;

an adjustment screw having a smooth conically tapered portion defining an axis, the adjustment screw being threaded into the threaded opening of the tool body parallel to the guide channel, the blade carriage being driven in motion perpendicular to the guide channel by single point contact with the tapered portion of the adjustment screw as the adjustment screw is rotated, the adjustment screw being rotatable in a first direction to increase the distance the slitting blade projects into the guide channel and in an opposite direction to decrease the distance the slitting blade projects into the guide channel; and a backlash prevention mechanism cooperating with the adjustment screw to prevent backlash as the adjustment screw changes from rotating in the first direction to rotating in the opposite direction, the backlash prevention mechanism including:

an adjustment screw spring in contact with the adjustment screw, the adjustment screw spring applying a spring force to the adjustment screw parallel to the axis of the adjustment screw, and a blade carriage spring in contact with the blade carriage, the blade carriage spring applying a spring force to the blade carriage perpendicular to the axis of the adjustment screw.

32. The cable slitting tool according to claim 31 wherein the backlash prevention mechanism further includes a deformable material in friction contact with the adjustment screw.

* * * * *

UNITED STATES PATENT AND TRADEMARK OFFICE
CERTIFICATE OF CORRECTION

PATENT NO.  : 6,581,291 B1
DATED       : June 24, 2003
INVENTOR(S) : Andrew J. Tarpill et al.

It is certified that error appears in the above-identified patent and that said Letters Patent is hereby corrected as shown below:

Title page,
Item [75], Inventors, delete "West Hartford" and substitute therefor -- Hartford --.

Column 4,
Lines 48-49, delete "1" and "8" and substitute therefor -- 18 --.

Signed and Sealed this

Fourth Day of November, 2003

JAMES E. ROGAN
*Director of the United States Patent and Trademark Office*